United States Patent
Scott

(10) Patent No.: US 10,398,129 B2
(45) Date of Patent: Sep. 3, 2019

(54) INFINITELY ADJUSTABLE COLLAR WITH MULTIPLE SECUREMENTS

(71) Applicant: Linda Louise Scott, Versailles, KY (US)

(72) Inventor: Linda Louise Scott, Versailles, KY (US)

( * ) Notice: Subject to any disclaimer, the term of this patent is extended or adjusted under 35 U.S.C. 154(b) by 171 days.

(21) Appl. No.: 15/470,953

(22) Filed: Mar. 28, 2017

(65) Prior Publication Data

US 2017/0196198 A1    Jul. 13, 2017

Related U.S. Application Data

(60) Provisional application No. 62/319,974, filed on Apr. 8, 2016.

(51) Int. Cl.
| | |
|---|---|
| *A01K 27/00* | (2006.01) |
| *B68B 3/06* | (2006.01) |
| *B68B 3/08* | (2006.01) |
| *A01K 13/00* | (2006.01) |
| *B68B 3/04* | (2006.01) |

(52) U.S. Cl.
CPC ............ *A01K 13/00* (2013.01); *A01K 27/001* (2013.01); *B68B 3/04* (2013.01); *B68B 3/06* (2013.01); *B68B 3/08* (2013.01)

(58) Field of Classification Search
CPC .......... A01K 27/001; B68B 3/04; B68B 3/06; B68B 3/08; B68B 3/12
USPC ....... 119/814, 815, 855, 856, 863, 864, 865; 54/19.1, 19.3, 21
See application file for complete search history.

(56) References Cited

U.S. PATENT DOCUMENTS

| | | | | |
|---|---|---|---|---|
| 298,126 | A * | 5/1884 | Staufenbeil | B68B 3/04 54/19.3 |
| 1,487,555 | A * | 3/1924 | Germundson | B68B 3/04 54/19.3 |
| 1,612,539 | A * | 12/1926 | Short | B68B 3/06 54/19.3 |
| 1,646,051 | A * | 10/1927 | Brown | B68B 3/04 54/19.3 |
| 1,672,474 | A * | 6/1928 | Stegner | B68B 3/04 54/19.1 |
| 4,545,370 | A * | 10/1985 | Welsh | A61F 5/028 128/95.1 |
| 4,862,563 | A * | 9/1989 | Flynn | A44B 18/00 24/442 |
| 5,147,261 | A * | 9/1992 | Smith | A61F 5/028 2/338 |
| 5,289,619 | A * | 3/1994 | Pileggi | A44B 18/00 24/17 AP |
| 5,785,011 | A * | 7/1998 | Gitterman, III | B68B 1/02 119/865 |
| 6,911,023 | B1 * | 6/2005 | Hamilton | A61F 13/5638 604/387 |

(Continued)

OTHER PUBLICATIONS

Photographs of prior art cribbing collar.

*Primary Examiner* — David J Parsley
(74) *Attorney, Agent, or Firm* — Dunan Galloway Egan Greenwald PLLC; Theresa Camoriano; Guillermo Camoriano

(57) ABSTRACT

A collar has an infinitely adjustable effective length with a securement mechanism that prevents the collar from being loosened or removed by rubbing against a fence or other fixed object.

12 Claims, 7 Drawing Sheets

(56) References Cited

U.S. PATENT DOCUMENTS

| | | | |
|---|---|---|---|
| 7,743,736 B2 * | 6/2010 | Winestock | A01K 13/006 119/814 |
| 8,069,540 B2 * | 12/2011 | Obiols | B65D 63/10 24/265 AL |
| 2016/0250061 A1 * | 9/2016 | Ingimundarson | A61F 5/022 602/19 |

* cited by examiner

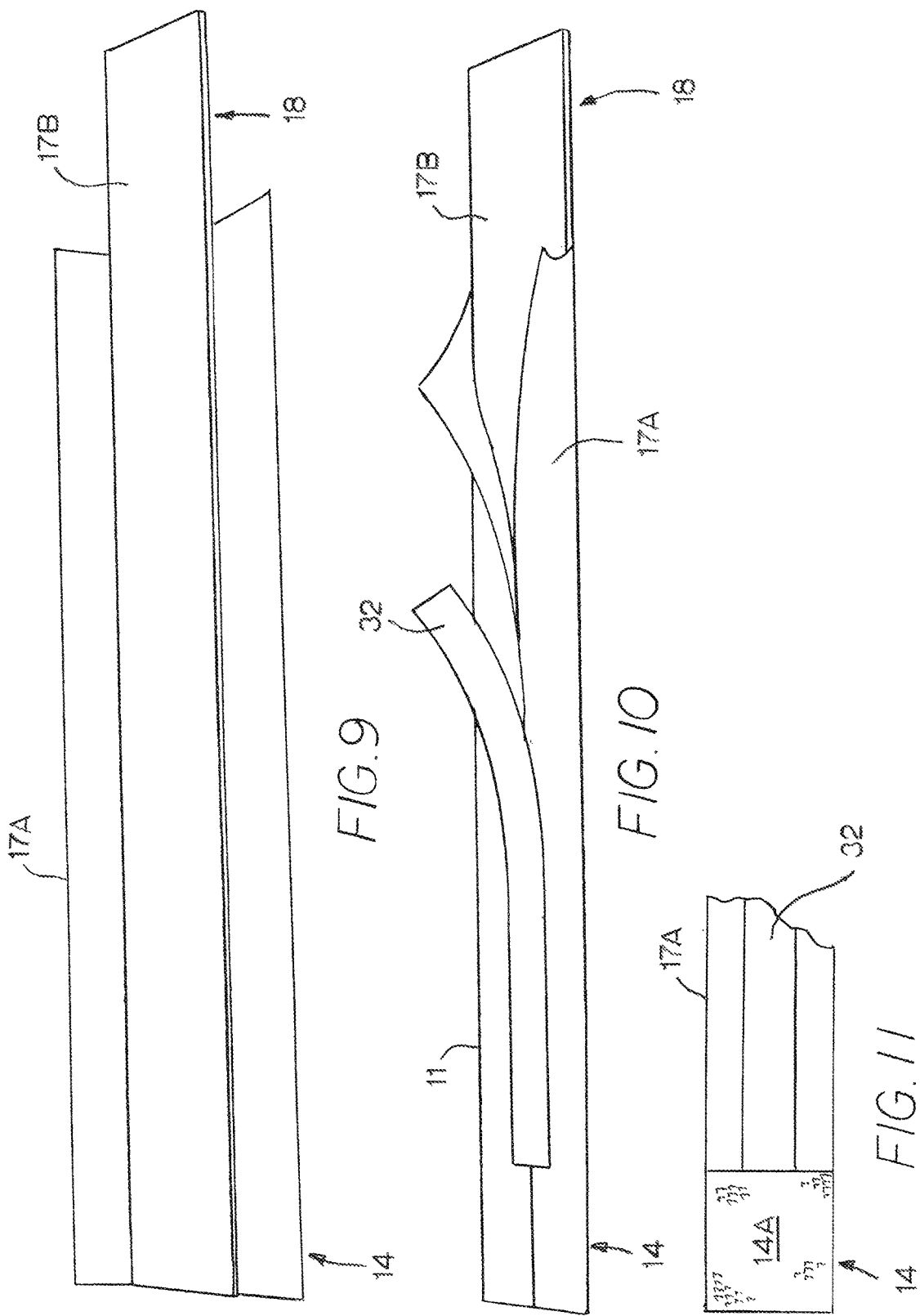

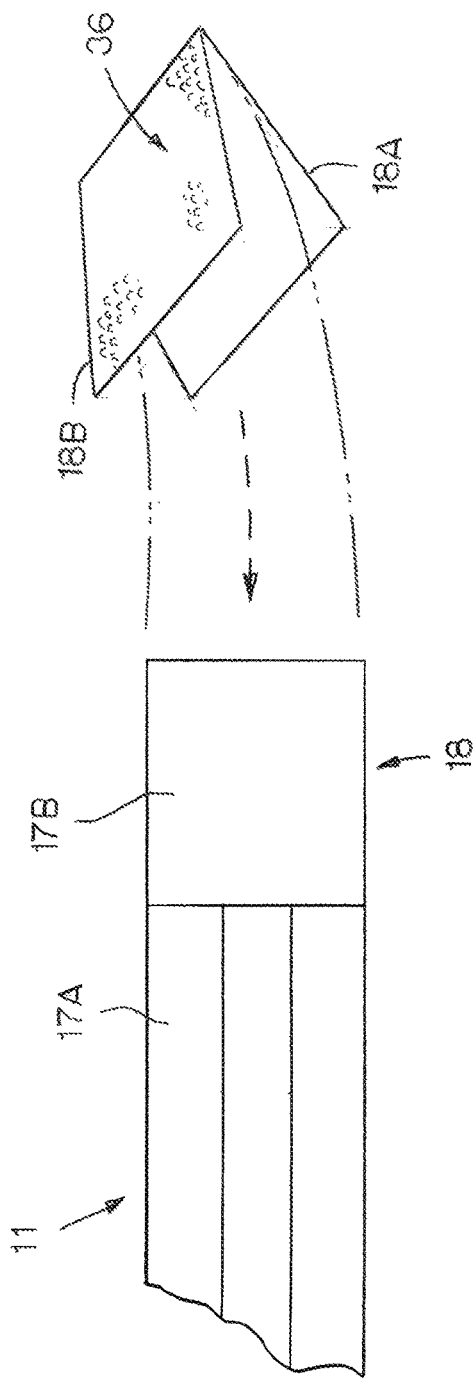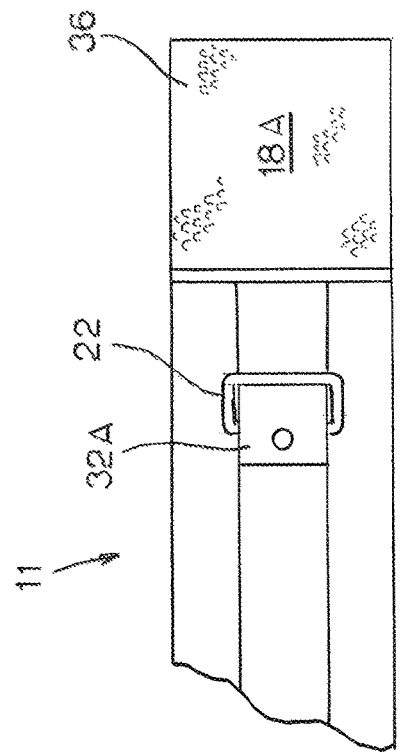

INFINITELY ADJUSTABLE COLLAR WITH MULTIPLE SECUREMENTS

BACKGROUND

Cribbing is a compulsive behavior in some horses. It involves the horse biting on an object, such as a fence or a feed trough, and then arching its neck downwardly, while pulling and sucking in air. The result can be not only destruction or damage to the object on which the horse is biting and pulling, but also harm to the health of the horse, which may ingest wood chips or other debris in the process. In some cases, the result is a need for colic surgery on the horse.

Many attempts have been made to discourage this behavior, but none have been very successful. Some collars have been used that have projections that poke the horse when the horse arches its neck downwardly for cribbing, but they can harm the horse, and they do not work if the horse brushes them against something and causes them to rotate around the horse's neck to a different orientation. Other collars are not stiff enough, so the horse is able to bend them in the width direction to effectively reduce their width so they no longer perform their function. The collars also can be removed or loosened by the horse by rubbing them against a fence or other fixed object or by another horse gripping the collar with its teeth and pulling on the collar, which defeats the purpose of the collar.

SUMMARY

The present invention provides a collar that prevents cribbing without harming the horse. The collar is stiff enough that it does not fold or collapse when the horse tries to arch its neck, so it prevents the horse from arching its neck enough to complete the action that is involved in cribbing. It has no sharp projections that might injure the horse. It can be infinitely adjusted by the user to precisely the desired length so that it remains snug enough to prevent the horse from arching its neck while still not interfering with normal breathing and swallowing. The horse cannot loosen or remove the collar or cause it to rotate to a non-functioning position by brushing it up against a fence or other fixed object.

While this description describes a secure, infinitely adjustable collar for a horse, the same or similar stiffening, adjustment and securement arrangements may be used for collars for other animals, including collars that go around an animal's neck, middle, or other body part, and even including a collar (belt) that goes around a human's waist, such as a weight-lifting belt.

BRIEF DESCRIPTION OF THE DRAWINGS

FIG. 9 is a perspective view showing a first step in making the collar of FIGS. 1-7;

FIG. 10 is the same view as FIG. 9 but showing the next step in making the collar;

FIG. 11 shows the next step to finish the left end of the collar;

FIG. 12 shows the next step to finish the right end of the collar;

FIG. 13 shows the step of adding a securement ring to the collar; and

DESCRIPTION

Figure 1:
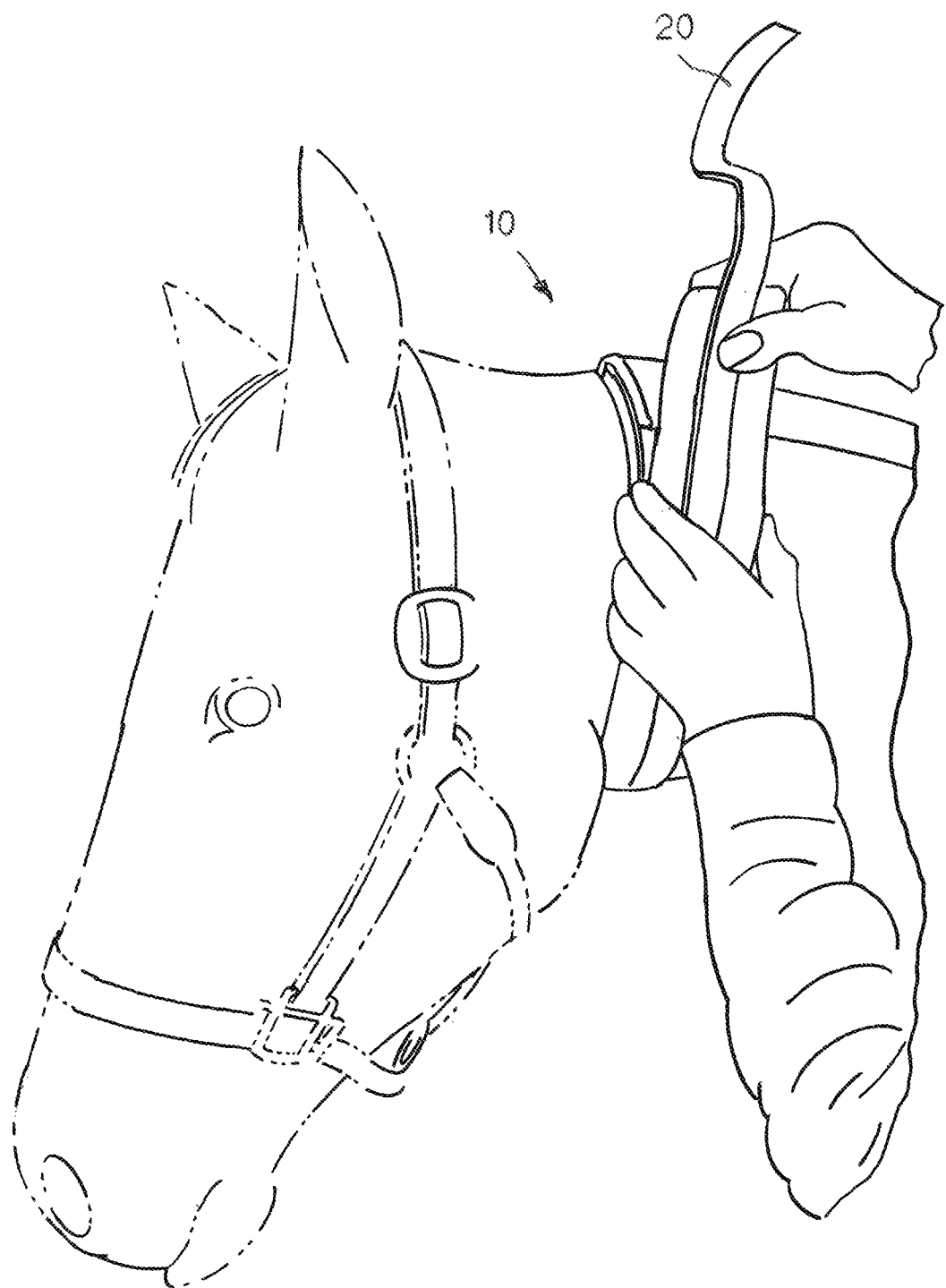
FIG. 1 shows a person placing a cribbing collar made in accordance with the present invention around a horse's neck.

FIG. 1 shows a person placing a cribbing collar 10 around the neck of a horse. The person will adjust the infinitely adjustable effective length of the collar 10 to the desired dimension, will close an alligator arrangement (described below) to fix the collar 10 at that desired dimension, and will then secure a securement strap 20 to ensure that the alligator arrangement remains closed.

Figure 2:
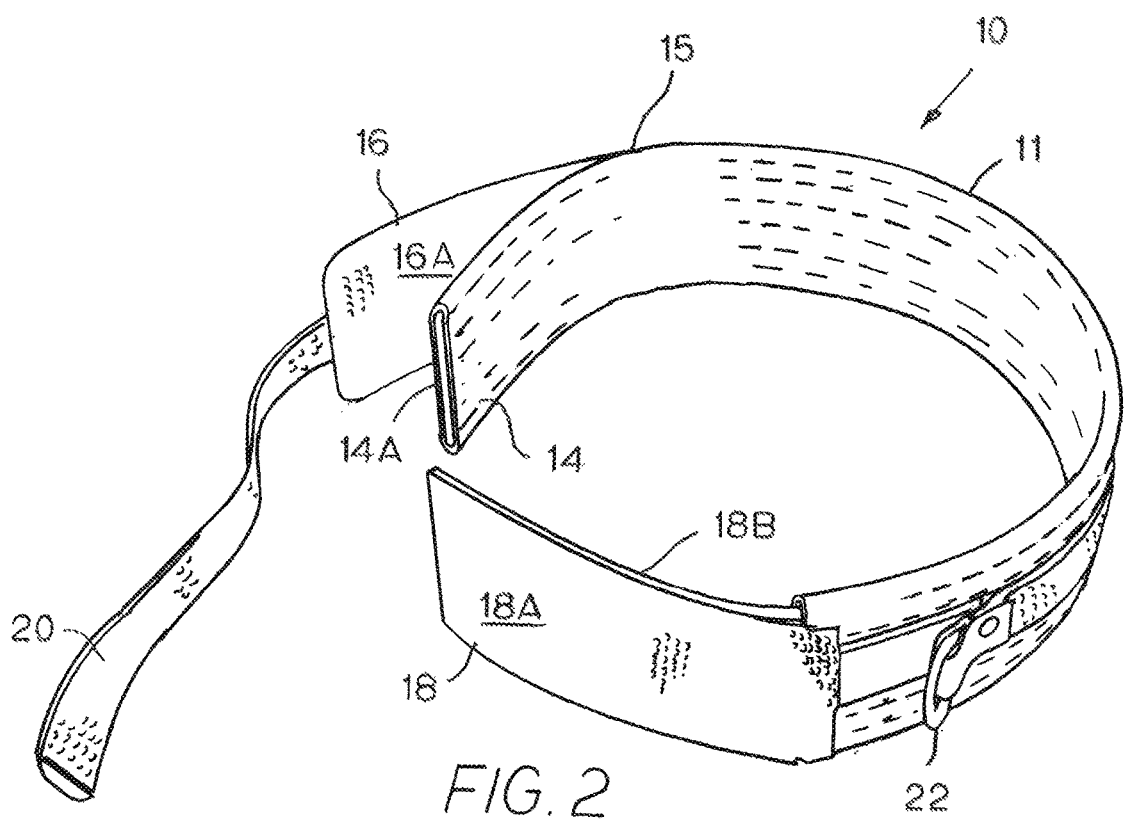
FIG. 2 is a perspective view of the collar of FIG. 1 in the open position.

FIG. 2 shows the collar 10 in an open position, before it is placed on the horse. The collar includes a main collar strip 11 that extends from a first end 14 to a second end 18, and an alligator flap 16, which overlies the outer surface of the main collar strip 11 along the first end 14. The alligator flap 16 is secured at its first end to the main collar strip 11 at a point 15, which, in this embodiment, is recessed about six inches from the first end 14 of the main collar strip 11. The second end of the alligator flap 16 is free. The alligator flap 16 and said first end 14 of said main collar strip 11 form an alligator mouth arrangement, with the alligator flap 16 hinging at the recessed point 15 and opening at its free end.

The alligator flap 16 has an inner surface 16A, facing a corresponding outer surface portion 14A at the first end 14 of the main collar strip 11, with the inner surface 16A of the alligator flap 16 and the corresponding outer surface portion 14A that faces the alligator flap 16 both including hook-and-loop fastener material. In this particular embodiment, the inner surface 16A of the alligator flap 16 and the corresponding outer surface portion 14A of the main collar strip 11 both have the hook side of a hook-and-loop fastener, so they do not fasten to each other.

The second end 18 of the collar has the loop side of a hook-and-loop fastener material on both its inner and outer surfaces 18B, 18A, so it secures to the inner surface 16A of the alligator flap 16 and to the corresponding outer surface portion 14A of the main collar strip 11.

There is a securement strap 20, which projects from the free end of the alligator flap 16 and is used to secure the alligator flap 16 in the closed position. The securement strap 20 is narrower than the main collar strip 11 and is recessed in from the top and bottom edges of the alligator flap 16 and of the main collar strip 11. The securement strap 20 also is more flexible than the alligator flap 16 and more flexible than the main collar strip 11. The securement strap 20 has hook-and-loop fastener material on its outer surface so it can extend through the ring 22 and be secured to itself by the hook and loop fastener. The ring 22 is recessed inwardly from the second end 18 of the collar 10.

When a person is putting the collar onto a horse's neck, as shown in FIG. 1, the person inserts the second end 18 of the collar 10 into the open alligator mouth arrangement formed by the first end 14 and alligator flap 16 until the desired effective collar length is reached (until the collar 10 is snug). Then, the person presses the surface 18B against the surface 14A, to secure the second end 18 and first end 14 of the collar 10 together, which fixes the effective length of the collar 10.

Next, the person closes the alligator flap 16, pressing the inner surface 16A of the alligator flap 16 against the surface 18A, which further secures the first and second ends 14, 18 of the collar 10 at the desired effective length. The alligator flap 16 and the end 18 extend for a substantial distance. In this embodiment, that distance is about six inches, which provides a considerable range of effective lengths of the collar 10 that can be obtained. Also, since the ends 14, 18 are secured together by hook and loop fastener, the effective length is infinitely adjustable within that range.

Figure 3:
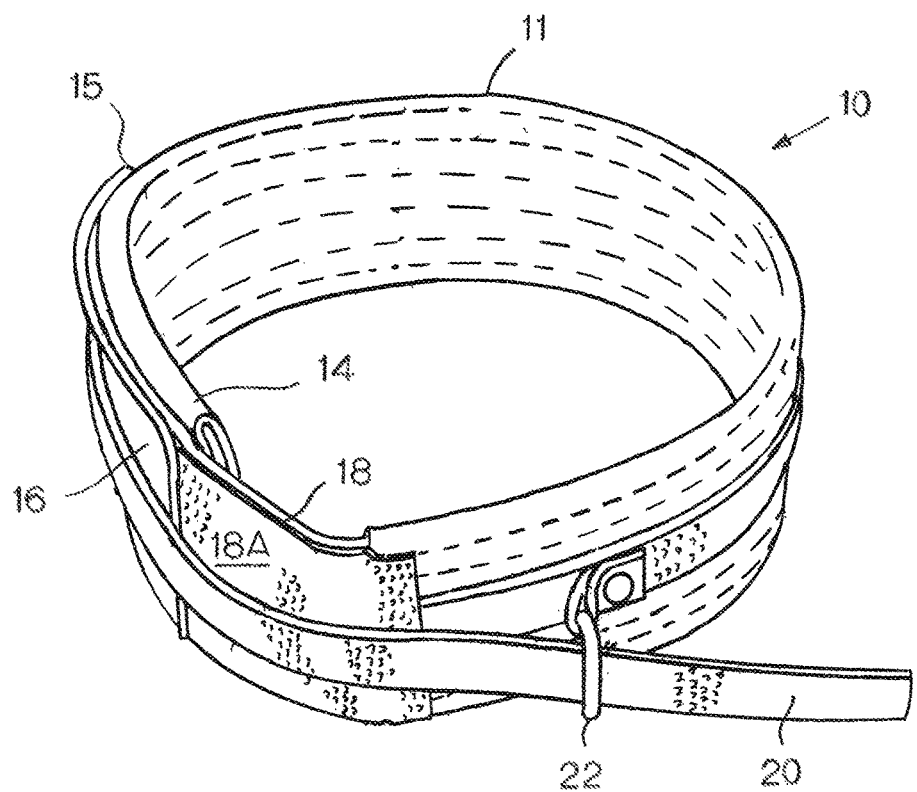
FIG. 3 is the same view as FIG. 2, but with the collar partially secured, with the effective length of the collar having been set.

At this point, as shown in FIG. 3, the second end 18 of the main collar strip 11 is sandwiched between the first end 14 and the alligator flap 16, and is secured by hook-and-loop fastener both to the first end 14, by the mating surfaces 14A, 18B, and to the flap 16, by the mating surfaces 18A, 16A. As mentioned above, this arrangement provides infinite adjustability, which enables the user to fit the collar 10 properly on the horse, so the collar 10 is neither too tight nor too loose.

Figure 4:
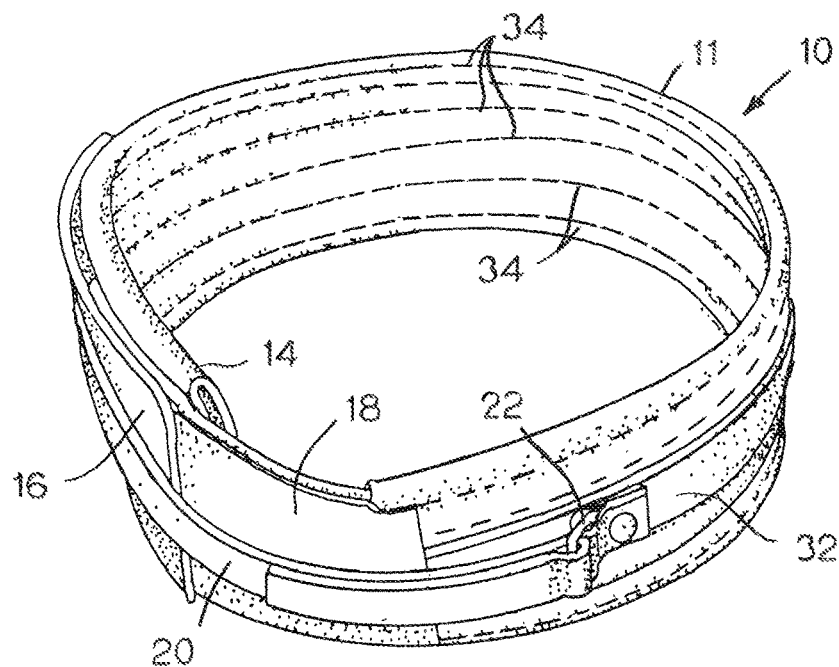
FIG. 4 is the same view as FIG. 3, but with the collar in the fully closed position, with the additional securement strap secured.
Figure 5:
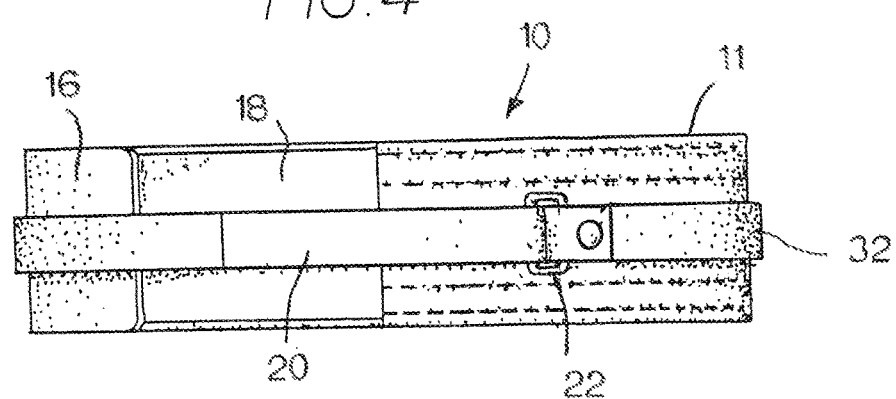
FIG. 5 is a front view of the collar of FIG. 4.
Figure 6:
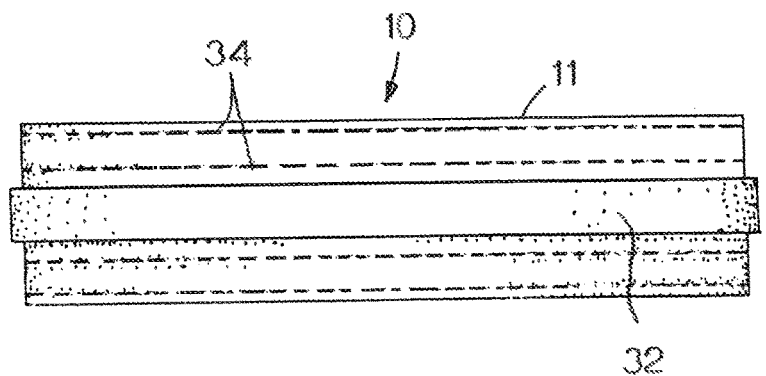
FIG. 6 is a rear view of the collar of FIG. 4.
Figure 7:
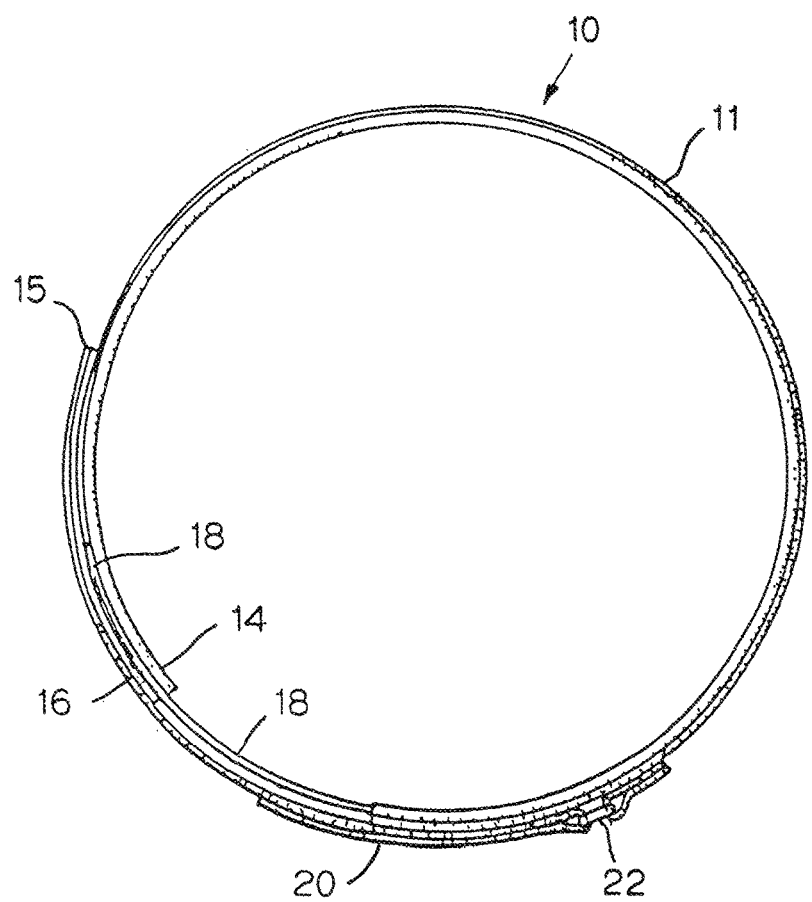
FIG. 7 is a top view of the collar of FIG. 4.

Next, as shown in FIG. 4, the securement strap 20 is inserted through the ring 22 and is pulled tightly back over itself, with the mating hook-and-loop fastener material on the mating surfaces of the strap 20 holding the strap 20 in place. The securement strap 20 holds the alligator flap 16 in the closed position, preventing the horse from being able to lift up the free end of the alligator flap 16 by rubbing it against a fence or other fixed object to loosen the alligator flap 16. Since the securement strap 20 is recessed in from the top and bottom edges of the main collar strip 11 and of the alligator flap 16 and is thinner and more flexible than the rest of the collar 10, the securement strap 20 is much more difficult for the horse to dislodge by rubbing against a fence or other fixed object.

In this particular embodiment, the securement strap 20 is about one inch wide and is recessed in from the top and bottom edges of the main collar strip 11 and from the top and bottom edges of the alligator flap 16, about one inch from each edge. It is desired that the securement strap 20 be recessed from each of the top and bottom edges of the collar 10 by at least one-half inch and that the securement strap 20 not be wider than two inches wide and preferably not wider than one-and-one-half inches wide. It has been found that, as a practical matter, horses are not able to dislodge the securement strap 20.

Figure 8:
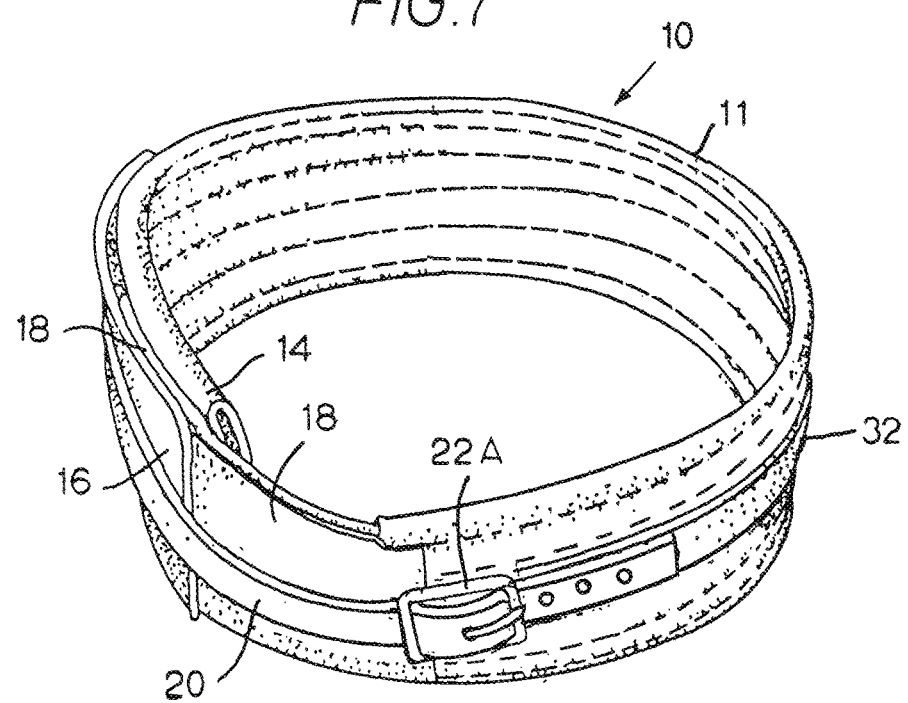
FIG. 8 is the same view as FIG. 4, but for an alternate embodiment.

While it is preferable for the securement strap 20 to be tightened by passing the securement strap 20 through the ring 22 and securing the securement strap 20 onto itself using a hook-and-loop fastener, because this provides infinite adjustment and is very secure, the securement strap 20 alternatively could be tightened and secured by other known means. For example, the securement strap 20 could pass through a ring that is part of the frame of a buckle 22A, as shown in FIG. 8, in which case the securement strap 20 has holes that receive the prong of the buckle 22A to secure the securement strap 20 in position. As long as the securement strap 20 is secured, the free end of the alligator flap 16 cannot be lifted up to loosen or remove the collar 10.

As shown in FIGS. 9 and 10, in order to manufacture the collar 10, the manufacturer begins with a strip of leather 17A (or other suitable material) having a width and a length. For example, if the collar 10 is to be made four inches wide, the strip of leather 17A will be eight inches wide. The collar 10 may be made in a variety of widths and lengths, depending upon the size of the horse. Of course, if the collar is to be used for a different purpose, such as for a weight-lifting belt, the dimensions and shape would be suited to that purpose.

A piece of reinforcing strapping 17B is taped down on top of the middle of the leather strip 17A. The reinforcing strapping 17B extends all the way to the left end of the leather strip 17A. This will form the first end 14 of the main collar strip 11 of the collar 10. Approximately six inches of this reinforcing strapping 17B extends out beyond the right end of the leather strip 17A. This will form the second end 18 of the main collar strip 11 of the collar 10. The reinforcing strapping 17B shown here is woven nylon strapping. Other suitable materials may be used. There may be additional layers of reinforcing strapping 17B on top of the first layer 17B, if desired.

As shown in FIG. 10, the strip of leather 17A is folded inwardly one-fourth of its width along each edge so that the edges meet in the middle, enclosing the reinforcing strapping 17B, except for the six-inch portion of the strapping 17B that extends out past the right end of the leather strip 17A.

The folded edges of the leather strip 17A are taped down over the reinforcing strapping 17B to hold the leather 17A and strapping 17B in position until the assembly can be stitched together along seam lines, with the leather 17A being wrapped around the woven strapping core 17B. It is preferred that there be a plurality of seam lines passing through all the layers and extending parallel to the top and bottom edges of the collar.

As shown in FIG. 10, a narrower piece of woven nylon reinforcing strapping 32 is taped down lengthwise on top of the center of the leather 17A, straddling the folded leather edges. This narrower piece of strapping 32 is stitched to the leather 17A along both edges of the strapping 32, stitching through all layers to secure all layers together. This forms two of the seam lines referred to above.

As shown in FIG. 10, the narrower strapping 32 terminates six inches short of the left end (the first end 14) of the leather 17A.

Next, as shown in FIG. 11, a wide piece of hook-and-loop fastener (the hook side), having the same width as the folded leather strip 17A, is placed on top of the leather strip 17A at the first end 14 and is sewn in place, sewing through all layers. This forms the outer surface 14A of the first end 14 of the collar 10.

As shown in FIGS. 12 and 13, at the right end (the second end 18), where the reinforcing strapping 17B extends beyond the leather strip 17A, a piece of hook-and-loop fastener 36 (the loop side) is folded in half, is placed over both the inner and outer surfaces of the reinforcing strapping 17B, and is sewn to the strapping 17B. The piece 36 also overlaps the leather 17A a short distance and is sewn to the leather 17A. This forms the second end 18 of the collar 10, which has hook-and-loop fastener (the loop side) on both its outer and inner surfaces 18A, 18B.

A narrow piece of strapping 32A is extended through the metal ring 22 and is riveted onto the collar 10 at a point recessed in from the second end 18 to secure the ring 22 to the outer surface of the main collar strip 11. Alternatively, the strapping piece 32A, which holds the metal ring 22 in place, may be sewn onto the collar 10.

Figure 14:
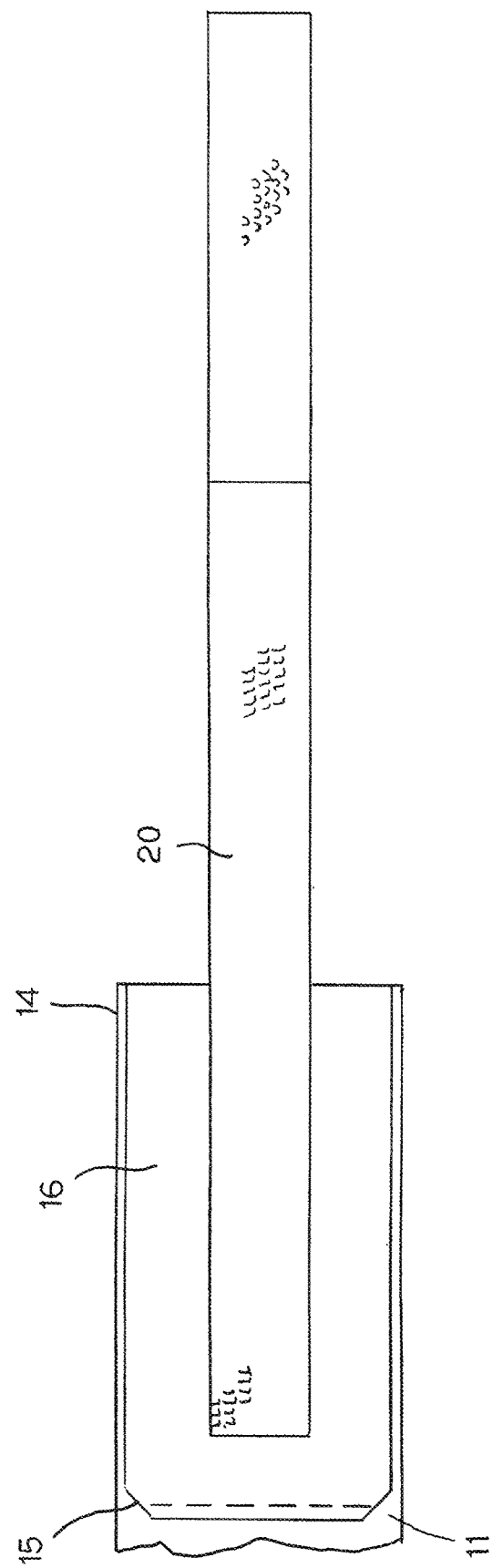
FIG. 14 shows the step of adding the alligator flap and securement strap.

Next, as shown in FIG. 14, the alligator flap 16 with securement strap 20 is made. The alligator flap 16 is made by sewing a piece of hook-and-loop fastener 16A onto the inner surface of a piece of leather that is about six inches long and the same width as the folded leather 17A. The piece of hook-and-loop fastener 16A can be seen in FIG. 2, and extends the full length of the alligator flap 16. The first end of the alligator flap 16 is sewn to the main collar strip 11 along a vertical line at the point 15, which is about six inches in from the first end 14 of the main collar strip 11 to form the hinge point of the alligator mouth arrangement.

As shown in FIG. 14, the narrow piece of securement strapping 20 is sewn onto the alligator flap 16, projecting from the free end of the alligator flap 16, and has hook and loop fastener material on its outer surface. Most of the length of the securement strap 20 has the loop side of the hook- and loop fastener, and about four inches of the right end has the hook side.

While, in this embodiment, the securement strap 20 is sewn onto the alligator flap 16, the securement strap 20 alternatively could be sewn onto the main collar strip 11 and could extend over the outer surface of the alligator flap 16. In either case, the securement strap 20 is secured to the collar 10, projects from the free end of the alligator flap 16, and secures the alligator flap in the closed position.

It can be seen in FIGS. 2-6 that several parallel rows of stitching 34 have been made through the leather 17A (and through the internal core strapping 17B), extending parallel to the top and bottom edges of the folded leather strip 17A. These rows of stitching 34 secure the leather 17A to the reinforcing strap 17B and prevent them from shifting relative to each other. This helps stiffen the main collar strip 11 of the collar 10, so the horse cannot bend the collar to effectively shorten the collar in the top-to-bottom direction.

It will be obvious to those skilled in the art that various materials may be used, and various modifications may be made to the embodiments described above without departing from the scope of the invention as claimed.

What is claimed is:

1. A collar, comprising:
   a main collar strip having a first width, inner and outer surfaces, top and bottom edges and first and second ends;
   an alligator flap overlying said outer surface of said main collar strip adjacent to said first end, said alligator flap having top and bottom edges, a hinge end and a free end, with said hinge end secured to said main collar strip at a point recessed from said first end of said main collar strip to form an alligator mouth arrangement, said alligator flap having an inner surface facing a corresponding portion of the outer surface of said main collar strip, wherein said inner surface of said alligator flap and said corresponding outer surface portion of said main collar strip facing said alligator flap include hook-and-loop fastener material, and wherein said second end of said main collar strip has inner and outer surfaces with hook-and-loop fastener material, such that said second end of said main collar strip can be inserted between and secured to said corresponding outer surface portion of said first end and said inner surface of said alligator flap by said hook and loop fastener materials, with said respective hook and loop fastener material on said inner surface of said alligator flap being in direct contact with said respective hook and loop fastener material on said outer surface of said second end of said main collar strip and said respective hook and loop fastener material on said corresponding portion of said main collar strip being in direct contact with said respective hook and loop fastener material on said inner surface of said second end of said main collar strip to establish an effective length of said collar; and
   a securement strap projecting over and beyond said free end of said alligator flap to secure said alligator flap in a closed position;
   said securement strap being recessed in from said top and bottom edges of said alligator flap and being more flexible than said alligator flap.

2. A collar as recited in claim 1, and further comprising a ring secured to said outer surface of said main collar strip at a point recessed from said second end, wherein said ring receives said securement strap to secure said alligator flap in a closed position.

3. A collar as recited in claim 2, wherein said securement strap has a second width that is less than said first width, and said securement strap is recessed from said top and bottom edges of said main collar strip.

4. A collar as recited in claim 3, wherein said securement strap has an outer surface with hook and loop fastener material and secures to itself by said hook and loop fastener material on said outer surface.

5. A collar as recited in claim 3, wherein said ring is part of a frame of a buckle, and said securement strap secures to said buckle.

6. A collar as recited in claim 4, wherein said main collar strip is sized and shaped to serve as a cribbing collar for a horse.

7. A collar as recited in claim 5, wherein said main collar strip is sized and shaped to serve as a cribbing collar for a horse.

8. A collar as recited in claim 6, wherein said main collar strip is made of leather which is wrapped around a core of woven strapping, and wherein said leather and woven strapping core are sewn together along a plurality of seam lines parallel to said top and bottom edges.

9. A collar as recited in claim 7, wherein said main collar strip is made of leather which is wrapped around a core of woven strapping, and wherein said leather and woven strapping core are sewn together along a plurality of seam lines parallel to said top and bottom edges.

10. A collar as recited in claim 3, wherein said alligator flap has an outer surface, and said securement strap overlies said outer surface of said alligator flap from a point recessed from said free end of said alligator flap, over said free end, and beyond said free end to said ring.

11. A collar as recited in claim 10, wherein said securement strap has an outer surface with hook and loop fastener material and secures to itself by said hook and loop fastener material on said outer surface.

12. A collar as recited in claim 10, wherein said ring is part of a frame of a buckle, and said securement strap secures to said buckle.

* * * * *